(12) United States Patent
Bleuse et al.

(10) Patent No.: US 11,099,278 B2
(45) Date of Patent: Aug. 24, 2021

(54) DEVICE FOR OPTICALLY MEASURING DOSES OF RADIATION ABSORBED BY A GEL DOSIMETER BY MEANS OF POLARIZED LIGHT

(71) Applicant: UNIVERSITÉ DE FRANCHE-COMTÉ, Besancon (FR)

(72) Inventors: Olivier Bleuse, Montbeliard (FR); Yannick Bailly, Bermont (FR); Régine Gschwind, Allenjoie (FR); Libor Makovicka, Châlonvillars (FR); Kévin Laurent, Offemont (FR); François Guermeur, Belfort (FR)

(73) Assignee: UNIVERSITÉ DE FRANCHE-COMTÉ, Besancon (FR)

( * ) Notice: Subject to any disclaimer, the term of this patent is extended or adjusted under 35 U.S.C. 154(b) by 40 days.

(21) Appl. No.: 16/645,094

(22) PCT Filed: Sep. 7, 2018

(86) PCT No.: PCT/FR2018/052193
§ 371 (c)(1),
(2) Date: Mar. 25, 2020

(87) PCT Pub. No.: WO2019/048796
PCT Pub. Date: Mar. 14, 2019

(65) Prior Publication Data
US 2020/0233097 A1    Jul. 23, 2020

(30) Foreign Application Priority Data

Sep. 7, 2017    (FR) ...................................... 1758268

(51) Int. Cl.
*G01T 1/04*    (2006.01)
*G01N 21/47*    (2006.01)

(52) U.S. Cl.
CPC ............... *G01T 1/04* (2013.01); *G01N 21/47* (2013.01); *G01N 2021/4792* (2013.01)

(58) Field of Classification Search
CPC .................. G01T 1/04; G01N 21/4795; G01N 2021/4792
See application file for complete search history.

(56) References Cited

U.S. PATENT DOCUMENTS 6,218,673 B1 *   4/2001   Gore .................. G01N 21/4795
                                                            250/473.1

OTHER PUBLICATIONS

International Search Report, PCT/FR2018/052193, dated Jan. 7, 2019.

(Continued)

*Primary Examiner* — Yara B Green
(74) *Attorney, Agent, or Firm* — Nixon & Vanderhye

(57) ABSTRACT

Disclosed is a device for measuring radiation doses absorbed by a gel dosimeter, including in particular a polarizer for a light beam according to at least two distinct polarization angles, the polarizer being positioned between a light source and an optical detector, a unit for measuring the value of the intensity of the light beam, which intensity is measured by the optical detector, and a unit for calculating the value of a ratio of intensities of the light beam, which intensities are measured by the optical detector, for two distinct polarization angles of the light beam that is selected by the polarizer.

20 Claims, 2 Drawing Sheets

(56) References Cited

OTHER PUBLICATIONS

Simon J Doran et al: "A CCD-based optical CT scanner for high-resolution 3D imaging of radiation dose distributions: equipment specifications, optical simulations and preliminary results", Physics in Medicine and Biology, vol. 46, No. 12, Dec. 1, 2001 (Dec. 1, 2001), pp. 3191-3213, XP55535894, Bristol GB.
0 Bleuse et al: "3D Dosimetry based on a new optical approach for dosimetry gels: Use of the polarisation ratio of the scattering light", Journal of Physics: Conference Series, vol. 847, May 1, 2017 (May 1, 2017), p. 012010, XP055466876, GB, ISSN: 1742-6588, D0I:10.1088/1742-6596/847/1/012010 figures 1, 4, 5, 6, 7.
Kelly R G et al: "Optical CT reconstruction of 3D dose distributions using the ferrous-benzoic-xylenol (FBX) gel dosimeter", Medical Physics, AIP, Melville, NY, US, vol. 1. 25, No. 9, Sep. 1, 1998 (Sep. 1, 1998), p. 1741-1750, XP012010578, ISSN: 0094-2405, D0I: 10.1118/1.598356C; figure 2.
Warren G. Campbell et al: "A prototype fan-beam optical CT scanner for 3D dosimetry : Prototype fan-beam OCT scanner for 3D dosimetry", Medical Physics., vol. 40, No. 6Part1, May 29, 2013 (May 29, 2013), p. 061712, XP055467101, US, ISSN: 0094-2405, D0I: 10.1118/1.4805111,II, III, figure 1.
Islam K T S et al: "Initial evaluation of commercial optical CT-based 3D gel dosimeter",Medical Physics, AIP, Melville, NY, US, vol. 30, No. 8, Aug. 1, 2003 (Aug. 1, 2003), pp. 2159-2168, XP012012195, ISSN: 0094-2405, D0I: 10.1118/11593636, III.
Wolodzko John G et al: "CCD imaging for optical tomography of gel radiation dosimeters", Medical Physics. AIP. Melville. NY, US, vol. 26. No. 11, Nov. 1, 1999 (Nov. 1, 1999). pp. 2508-2513. XP012010658,ISSN: 0094-2405. 001: 10.1118/1.598772, II-A; figure 2.

\* cited by examiner

DEVICE FOR OPTICALLY MEASURING DOSES OF RADIATION ABSORBED BY A GEL DOSIMETER BY MEANS OF POLARIZED LIGHT

TECHNICAL FIELD

The present invention relates to a device for measuring at least one dose of radiation absorbed by a gel dosimeter, as well as a method for implementing the measurement device for measuring the value of one or several doses absorbed by the gel dosimeter.

STATE OF THE ART

Radiotherapy allows treating many pathologies in a patient without requiring the use of invasive operations. Radiotherapy hence offers an alternative to the surgical techniques, in order to avoid postoperative trauma in the patient.

For that purpose, radiotherapy treats the tumoral tissues in a patient by exposing them to sufficient doses of radiation in order to irreversibly damage them. The efficiency of this method hence requires an absolute control of the area irradiated, in order not to damage the neighbouring healthy tissues. To be sure of that, it is known to use metrological systems that control the treatment ballistics.

These metrological systems reproduce the volume and density from the radiological point of view by using or not elements equivalent to the tissues of an area desired to be treated in a patient. These metrological systems are made from gel dosimeters that have the particularity to change of structure as a function of the dose of radiation received. After the irradiation, the metrological system is analysed by a magnetic resonance imaging (MRI) technique or by an optical reading providing two or three-dimensional views of the inside of the gel. Hence, the treatment schedules are validated by the metrological systems so as to ensure that the doses of radiation administered irradiate the target volumes while sparing the healthy volumes.

However, this MRI analysis method proves to be very expensive considering the operating cost of this technique. Moreover, it is not readily accessible due to the small number of machines available. This technique of analysis is also limited to evaluate the influence of small doses of radiation on the structure of a gel dosimeter due to its low sensitivity and poor response to low doses of radiation. Moreover, the sensitivity of the metrological system fluctuates as a function of the ambient temperature. The other optical reading techniques also suffer from artefacts and very long reading times.

The present invention hence aims at proposing a device and a method for measuring doses of radiation absorbed by a gel dosimeter that are more accurate, faster, cheaper to implement, of high availability and with a measuring range covering not only the low doses (lower than 1 Gy) but also the high doses administered to the target volume, and hence establishing the dosimetry map of all the doses administered.

DESCRIPTION OF THE INVENTION

The invention proposes a device for measuring at least one dose of radiation absorbed by a gel dosimeter, comprising a light source emitting a light beam whose wavelength is modifiable over time, a support for positioning a gel dosimeter in the light beam emitted by the light source and a light beam optical detector positioned so that its detection axis forms a scattering angle with the axis of the light beam at the support.

The invention is remarkable in that the measurement device comprises:
- a means for polarizing the light beam according to at least two distinct polarization angles, the polarization means being positioned between the light source and the optical detector; and
- a unit for measuring the value of the light beam intensity measured by the optical detector; and
- a unit for calculating the value of a ratio of intensities of the light beam, measured by the optical detector, for two distinct and successive polarization angles of the light beam selected by the polarization means.

Hence, the measurement device according to the invention is operable to calculate at least one ratio of two light intensities of a same area in a gel dosimeter. Each light intensity corresponds to a specific polarization performed at distinct moments of the light beam detected by the optical detector. Now, the inventors have observed that the value of this ratio depends directly on the gel dosimeter structure, said structure evolving as a function of the dose of radiation absorbed by the gel. That way, the measurement of this ratio advantageously provides information about the dose of radiation absorbed by the gel dosimeter in a simple, fast and far cheaper way with respect to an analysis technique using MRI. Advantageously, the light beam intensity measurements are made for two distinct polarization angles and at two different moments in order to guarantee a rigorous spatial correspondence between these two measurements.

According to a preferred embodiment of the invention, the scattering angle value is comprised between 10° and 350°, preferably between 30° and 120°, preferably between 30° and 85° and/or between 95° and 120°. In other words, the optical detector is positioned so that its detection axis forms an acute, right or obtuse angle with the light beam at the support. In the value ranges mentioned hereinabove, the inventors have obtained more accurate information about the doses of radiation absorbed by a gel dosimeter. In other words, the principle of the invention is to measure a ratio of intensities of the light beam scattered through a gel dosimeter, according to one or several angles of observation, for two different polarizations of the incident light beam or two different polarizations of the collected beam or any combination of these two situations.

According to another embodiment of the invention, the calculation unit is configured to associate, with at least one value of the intensity ratio calculated by the calculation unit, a value of dose of radiation absorbed by a gel dosimeter. According to a preferred embodiment, the calculation unit comprises a memory unit in which is memorized a look-up table between at least one value of an intensity ratio calculated by the measurement unit and one value of dose of radiation absorbed by a gel dosimeter.

According to another embodiment of the invention, the light source comprises a means for selecting at least two distinct wavelength ranges, observable by the optical detector. Preferably, the selection means comprises one or several optical filters for performing these selections. According to a preferred embodiment, the light source comprises at least one laser source or an incoherent source. According to another embodiment of the invention, the polarization means comprises a first polarizer positioned between the light source and the support, and a second polarizer positioned between the support and the optical detector.

According to another embodiment of the invention, the polarization means comprises a first polarizer and a second polarizer, both positioned between the light source and the support. This embodiment favours the detection of a more intense light signal by the optical detector. According to a variant embodiment, the polarization means comprises a first polarizer and a second polarizer, both positioned between the support and the optical detector.

According to another embodiment of the invention, the measurement device comprises a scattering means positioned between the light source and the support, for uniformizing the polarization of the light beam emitted by the light source. Advantageously, this embodiment allows uniformizing the polarization of the light beam before the latter illuminates a gel dosimeter placed on the support.

According to another embodiment of the invention, the measurement device comprises means for moving the support with respect to the detection axis of the detector, preferably by preserving the scattering angle value. The support moving means are preferably adapted to move a gel dosimeter positioned on the support, in at least two different directions, preferably in a three-dimensional space. Potentially, the moving means may be configured to pivot the support.

According to another embodiment of the invention, the measurement device comprises means for pivoting the optical detector with respect to the support, in order to modify the scattering angle value.

According to another embodiment of the invention, the measurement device comprises two oscillating mirrors, linearly or angularly oscillating at frequencies higher than the inverse of the measurement time of the measurement unit, positioned on the light beam path between the light source and the optical detector. This particular arrangement of the invention advantageously allows limiting the formation of speckle at the measurement unit.

According to another embodiment of the invention, the measurement device comprises, on the light beam path between the light source and the optical detector, an oscillating mirror for generating a sheet of light in a gel dosimeter present on the support. This embodiment advantageously allows performing faster measurements in different areas of the gel dosimeter. Potentially, the measurement device may include several measurement units distributed about the support, for performing simultaneous measurements in different areas of the gel dosimeter.

Of course, the different characteristics, variants and embodiments mentioned hereinabove may be associated with each other according to various combinations, insofar as they are not mutually incompatible or exclusive.

The invention also relates to a method for measuring at least one dose of radiation absorbed by a gel dosimeter using a measurement device as described hereinabove, implementing the following steps:
  positioning a gel dosimeter on the support so that the light beam emitted by the light source illuminates the gel dosimeter at a first wavelength;
  directing the optical detector so that its detection axis passes through the gel dosimeter and forms a scattering angle with the light beam;
  determining, by the measurement unit, the light intensity observed by the optical detector;
  modifying the polarization angle of the light beam using the polarizing means and/or modifying the wavelength of the light beam;
  determining again, by the measurement unit, the light intensity observed by the optical detector;
  estimating, by the calculation unit, a ratio between the two intensities measured by the optical detector;
  identifying in a look-up table, by the calculation unit, a dose of radiation absorbed by a gel dosimeter from the value of the intensity ratio estimated by the calculation unit.

Advantageously, the invention proposes a method for directly measuring a dose of radiation absorbed by a gel dosimeter, insofar as no dose field reconstruction is required. Indeed, contrary to the indirect methods for measuring the absorption of a dose of radiation, based on a measurement of the absorption of the light intensity of a beam passing through a gel dosimeter, it is not necessary to perform a series of measurement lines in the whole gel volume, whose results integrate the absorption of doses over the whole trajectory of the light beam and hence impose a complex reconstruction to estimate a local radiation value.

According to a variant of the measurement method, the following steps are implemented:
  a) positioning a gel dosimeter on the support so that the light beam emitted by the light source illuminates the gel dosimeter at a first wavelength;
  b) directing the optical detector so that its detection axis passes through the gel dosimeter and forms a scattering angle with the light beam;
  c) determining, by the measurement unit, the light intensity observed by the optical detector;
  d) modifying the polarization angle of the light beam using the polarization means;
  e) determining again, by the measurement unit, the light intensity observed by the optical detector;
  f) estimating, by the calculation unit, the value of a ratio between the two intensities measured by the optical detector, called polarization rate;
  g) modifying the wavelength value of the light beam emitted by the light source and/or modifying the scattering angle;
  h) reproducing steps c) to g) several times in a row in order to obtain polarization rates for different couples of wavelength and scattering angle values;
  i) modelling, by the calculation unit, a theoretical polarization rate as a function of the size of the scattering structure present in the gel dosimeter;
  j) identifying, by the calculation unit, of a size of scattering structures present in each model of the theoretical polarization rates;
  k) identifying in a look-up table, by the calculation unit, a dose of radiation absorbed by a gel dosimeter from the value of the intensity ratio estimated by the calculation unit.

Advantageously, the invention proposes a direct measurement method that is not based on a phenomenon of absorption of the light beam by the gel dosimeter. That way, the measurements obtained by the invention do not use the variation of the absorption as a function of the wavelength of the light beam emitted by the light source.

According to another embodiment of the invention, the preceding steps are reiterated for a gel dosimeter irradiated at different known doses, in order to establish a look-up table. In other words, the present invention also relates to a method for calibrating or establishing a look-up table for a type of gel dosimeter submitted to different know doses of radiation.

According to another embodiment of the invention, the scattering angle of the detector is modified as a function of the light beam wavelength range selected by a selection means.

According to another embodiment of the invention, the support is moved between each series of measurements in order to obtain the doses of radiation absorbed by the gel dosimeter in a two-dimensional plane, preferably in a three-dimensional volume.

DESCRIPTION OF THE FIGURES

The invention will be better understood thanks to the following description that relates to preferred embodiments, given by way of non-limitative examples, and illustrated by the following figures.

DESCRIPTION OF DETAILED EMBODIMENTS OF THE INVENTION

As a reminder, the invention proposes a device and a method for measuring doses of radiation absorbed by a gel dosimeter that are more accurate, faster and cheaper to implement.

Figure 1:
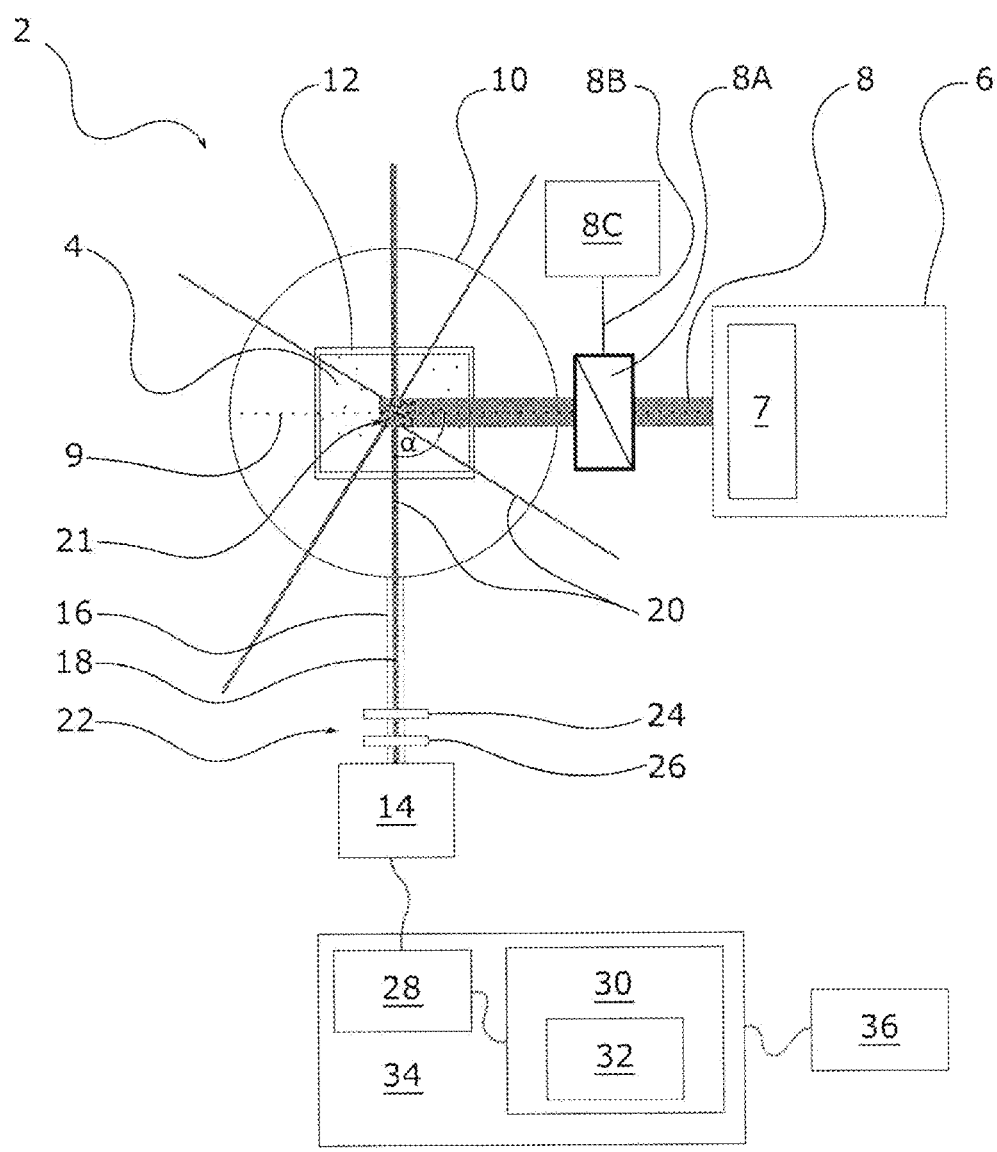
FIG. 1 shows a top view of a measurement device according to the invention.

FIG. 1 illustrates an exemplary embodiment of a device 2 according to the invention for measuring doses of radiation absorbed by a gel dosimeter 4. For that purpose, the measurement device comprises a light source 6 emitting a light beam 8 along an optical axis 9 towards a support 10. According to the present example, the light source is of the white light type (for example, a xenon source) that, coupled with monochromatic filters, selects either a single wavelength comprised between 200 nm and 700 nm, or a system coupling lasers for wavelengths comprised between 350 and 700 nm. The light source 6 includes a selection means 7 for emitting light beams in distinct wavelength ranges, for example at the following wavelengths: 350 nm, 432 nm, 534 nm, 576 nm and 634 nm. By way of example, the selection means 7 may comprise one or several narrow-band optical filters. Whatever the contemplated configuration, the polarization of the incident beam must be known, in the absence of specification, it is supposed that the incident beam is not polarized or of circular polarization.

The measurement device 2 also includes a splitter 8A of the light beam 8, interposed between the light source 6 and the support 10. The splitter 8A is configured to deviate a small part 8B of the light beam 8 towards an optical detector 8C for controlling the constancy of the light beam 8.

The support 10 allows positioning in the light beam 8 a transparent container 12 containing the gel dosimeter 4. According to the present example, the support is a motorized precision stage for moving the support according to three distinct axes in order to be able to expose different areas of the gel dosimeter 4 to the light beam 8. Potentially, the support may have an axis of rotation in order to expose different faces of the gel dosimeter 4 to the light beam 8. According to a preferred embodiment, the support 10 is motorized in order to allow remotely modifying the area of the gel dosimeter 4 that is illuminated by the light beam 8.

The measurement device 2 also comprises an optical detector 14 for measuring the light intensity of the light beam 20, filtered (or not), according to the presence (or absence) of the elements 24 and 26.

The optical detector 14 is mounted on an arm 16 pivoting about the support 10 so that the detection axis 18 of the optical detector forms a scattering angle α with the axis 9 of the light beam 8 at the support 10. In other words, the optical detector 14 is directed in such a manner to sense the intensity of a light beam 20 scattered by aggregates 21 present in the gel dosimeter 4. By "aggregate", it is also meant microdomains formed by radio-formed polymers, or any element having absorbed the dose of radiation. The size of the aggregates depends on the dose of radiation received by the gel dosimeter.

According to a preferred embodiment, the arm 16 is motorized to allow remotely modifying the scattering angle value α. The scattering angle value α is comprised between 10° and 170°, preferably it is comprised between 30° and 60°. According to the present example, the scattering angle value α is of 90°.

The measurement device 2 also comprises a means 22 for polarizing the light beam according to at least two distinct polarization angles. According to the present example, the polarization means 22 comprises a first linear polarizer 24 and a second linear polarizer 26, both mounted on the mobile arm 16 in such a manner to be positioned between the support 10 and the optical detector 14. The first and second polarizers are directed so that their transmission axes form a polarization angle β comprised between 10° and 170°, preferably of the order of 90°. Hence, the polarizers allow modifying the polarization angle β of the light beam 20 scattered by the gel dosimeter 4 before being detected by the optical detector 14.

According to a variant embodiment of the invention, not shown, the first polarizer 24 could be positioned between the light source 6 and the support 10, or both polarizers could be positioned between the light source and the support.

According to another variant embodiment of the invention, not shown, two polarizers could be positioned between the light source 6 and the support 10, two other polarizers could be positioned between the support 10 and the optical detector 14.

The optical detector 14 is hence directed towards the support 10 so as to be able to sense the intensity of a light beam 20 scattered by aggregates 21 present in the gel dosimeter 4. To allow an accurate measurement of the value of this intensity, the optical detector 14 is connected to a measurement unit 28. It is to be noted that, according to the present example, the polarization means 22 allows choosing two successive polarizations of the light beam 20 so as to guarantee a rigorous spatial correspondence between the light intensity measurements made by the measurement unit 28.

The measurement unit 28 is connected to a calculation unit 30 configured to calculate the value of a ratio of intensities of the light beam 20 scattered by the gel dosimeter 4, measured by the optical detector 14, for two distinct polarization angles of the light beam selected by the polarization means 22.

According to the present example, the calculation unit 30 also comprises a memory unit 32 in which is memorized a look-up table between several values of intensity ratios calculated by the measurement unit and values of doses of radiation absorbed by a gel dosimeter. In the present case, the measurement unit 28, the calculation unit 30 and the memory unit 32 are integrated into the central unit 34 of the computer or microcomputer type. The central unit 34 is connected a display device 36 of the display screen type, in order to allow a user of the measurement device 2 to read a determined radiation dose value from the measurements of intensity of the light beam 20 and the look-up table.

According to a preferred embodiment, the motorized stage, the motorized arm and the selection means are also connected to the central unit 34 to allow the automatization by the central unit of a measurement method as described hereinafter.

It is to be noted that a measurement device 2 according to the invention may include simultaneously several optical detectors 14 positioned about the support 10 so as to form different value observation angles. This embodiment, not shown, advantageously allow multiplying the angles of observation of the gel dosimeter 4 in order to reduce the time of acquisition of the intensity measurements, in order to establish more rapidly a spatial representation of the doses of radiation absorbed by the gel dosimeter 4.

It is to be noted that the detection of the two polarizations may be performed simultaneously by splitting the beam 20 into its two polarization components and by using simultaneously two optical detectors 14 (one for each component).

The invention also relates to a method for measuring at least one dose of radiation absorbed by a gel dosimeter 4 using a measurement device 2 as described hereinabove.

According to the present example, the measurement method implements a step of positioning a gel dosimeter 4 on the support 10 so that the light beam 8 emitted by the light source 6 illuminates an area of the gel dosimeter 4 with a known polarization. The optical detector 14 is then directed in such a manner that its detection angle 18 passes through the gel dosimeter 4 and forms a scattering angle $\alpha$ with the light beam 8 so as to detect a light beam 20 scattered by aggregates 21 present in the gel dosimeter 4. The measurement unit 28 then determines a first light intensity $I_1$ observed by the optical detector 14 according to a first angle $\beta_1$ of polarization of the light beam by the polarization means 22. The polarization angle of the light beam 8 is then modified using the polarization means 22 in order to allow the measurement unit 28 to measure a new light intensity value $I_2$ observed by the optical detector 14 according to a second polarization angle $\beta_2$. From these two intensity values, the calculation unit 30 estimates the value of a ratio R between the two intensities measured for two distinct polarization angles. The value of this ratio is then compared by the calculation unit to a look-up table in order to determine from the value of this ratio R a dose of radiation absorbed by the gel dosimeter 4. The value of this dose of radiation is then displayed on the display device to communicate this information to a user of the measurement device 2.

The calculation unit 30 estimates the value of the ratio R between two light intensities by previously subtracting the background noise of the optical detector 14, in one of the following manners:

$$R = \frac{I_1}{I_2} \text{ or } R = \frac{I_2}{I_1} \text{ or } R = \frac{I_1 - I_2}{I_1 + I_2} \text{ or } R = \frac{I_1 + I_2}{I_1 - I_2}$$

$$R = \frac{I_1}{I_2} - A \text{ or } R = \frac{I_2}{I_1} - A \text{ or } R = \frac{I_1 - I_2}{I_1 + I_2} - A \text{ or } R = \frac{I_1 + I_2}{I_1 - I_2} - A$$

It is to be noted that the inventors have observed that the accuracy of the measurements obtained by the above-described measurement device 2 varies as a function of the nature of the gel dosimeter and also depends on the wavelength range of the light beam illuminating the sample, on the deviation between the polarization angles $\beta_1$ and $\beta_2$ and on the scattering angle value $\alpha$. That is why the invention also relates to a method for establishing a look-up table as mentioned hereinabove, consisting in reproducing the preceding steps with gel dosimeters whose dose of radiation in previously known. Hence, it may be determined empirically, for each type of gel dosimeter, the wavelength ranges of the light beam 8, the deviations between the polarization angles $\beta_1$ and $\beta_2$ and the values of the scattering angle $\alpha$ providing accurate measurements of the dose of radiation absorbed by a gel dosimeter. In other words, these values are liable to change as a function of the nature of the gel dosimeter and of the quantity of radiation absorbed.

For that purpose, the calculation unit 30 may comprise an automated method for establishing look-up tables by varying the value of the parameters mentioned hereinabove. Hence, the measurement device 2 according to the invention allows a simple and fast determination of the optimum values of these parameters as a function of each type of gel dosimeter.

Figure 2:
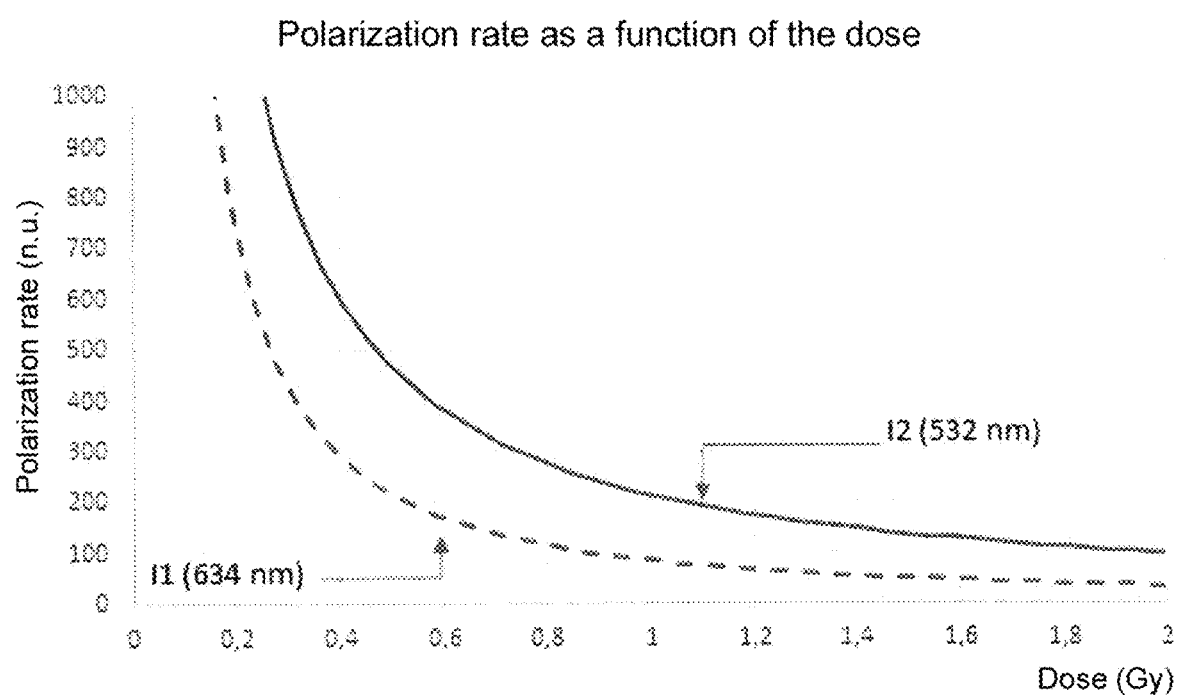
FIG. 2 illustrates a correspondence curve associating, with different ratio values R, doses of radiation absorbed by a gel dosimeter of the polymer type.

By way of example, the inventors have hence been able to establish a correspondence curve illustrated in FIG. 2 associating, with different values of ratio R, doses of radiation absorbed by a gel dosimeter of the polymer type. More precisely, these measurements have been made on a gel dosimeter based on polymers of the nMAG type, with 2% w/w, methacrylic acid (MMA), gelatin (1% w/w) (Type A, 300; Sigma Aldrich). The gel dosimeter is illuminated a light source of the laser type or by a white light emitting a light beam at a power comprised between 0 and 150 mW, whose wavelength range is comprised between 200 and 700 nm, in the present case 634 nm for $I_1$ and 532 nm for $I_2$. The deviation between the polarization angles $\beta_1$ and $\beta_2$ is of the order of 90° and the scattering angle value $\alpha$ is centred to 90°.

From this correspondence curve, the above-described measurement device 2 allows a very fast and easy accurate measurement of the radiation dose level absorbed by a gel dosimeter of same nature, in a far cheaper way than the currently used techniques.

According to a variant embodiment of the above-described measurement method, the calculation unit 30 performs several times the calculation of the above-described ratio R for a same sample. Previously to the calculation of a new ratio R, the wavelength and/or the scattering angle of the light beam 20 are modified. A set of values of ratio $R_{(ij)kr}$, as defined hereinafter (or in paragraph § [46]) and called polarization rate ratio, is hence obtained:

$$R_{(ij)kr} = \frac{I_{ijk}}{I_{ijr}}$$

with $I_{ijk}$ corresponding to a value of the light beam intensity measured by the optical detector 14, for a wavelength i, a scattering angle j and a polarization angle of the light beam equal to k, and $I_{ijr}$ corresponding to a value of the light beam intensity measured by the optical detector 14, for a wavelength i, a scattering angle j and a polarization angle of the light beam equal to r, the value of r being different from the value of k.

According to another step, for each polarization rate ratio R(ij)kr calculated hereinabove, the calculation unit 30 performs a theoretical calculation of the value of this polarization rate as a function of the size of the scattering structures present in the gel dosimeter. This theoretical calculation is performed from the TMatrix method as described in the following document: "*Scattering, absorption and emission of light by small particles*"—Michael I. Mishchenko, Larry D. Travis, Adrew A. Lacis—Cambridge University Press.

Preferably, this theoretical calculation is performed within the framework of the Mie theory that corresponds to the limit case in which the scattering structures have a size parameter tending to 3.

According to another step, the calculation unit 30 identifies the theoretical size of the scattering structures common to each theoretical calculation of the polarization rate ratio previously performed.

According to another step, the calculation unit 30 associates, with this theoretical size common to each theoretical calculation of the polarization rate ratio, a dose of radiation present in a look-up table associated with the gel dosimeter and prerecorded in the memory unit 32.

The invention claimed is:

1. A device (2) for measuring at least one dose of radiation absorbed by a gel dosimeter (4), comprising:
    a light source (6) emitting a light beam (8) whose wavelength is modifiable over time;
    a support (10) for positioning a gel dosimeter (4) in the light beam (8) emitted by the light source (6);
    an optical detector (14) of the light beam (8), positioned so that its detection axis (18) forms a scattering angle ($\alpha$) with the axis of the light beam (8) at the support (10);
wherein the measurement device (2) comprises:
    a means (22) for polarizing the light beam (8) according to at least two distinct polarization angles, the polarization means (22) being positioned between the light source (6) and the optical detector (14); and
    a unit (28) for measuring the value of the light beam (8) intensity measured by the optical detector (14); and
    a unit (30) for calculating the value of a ratio of intensities of the light beam (8), measured by the optical detector (14), for two distinct and successive polarization angles of the light beam (8) selected by the polarization means (22) and/or for two distinct and successive wavelengths of the light beam (8), the calculation unit (30) being configured to associate, with at least one value of the intensity ratio calculated by the calculation unit (30), a value of dose of radiation absorbed by a gel dosimeter (4).

2. The measurement device (2) according to claim 1, wherein the scattering angle value ($\alpha$) is comprised between 10° and 350°.

3. The measurement device (2) according to claim 2, wherein the calculation unit (30) comprises a memory unit (32) in which is memorized a look-up table between at least one value of an intensity ratio calculated by the measurement unit (28) and one value of dose of radiation absorbed by a gel dosimeter (4).

4. The measurement device (2) according to claim 1, wherein the calculation unit (30) comprises a memory unit (32) in which is memorized a look-up table between at least one value of an intensity ratio calculated by the measurement unit (28) and one value of dose of radiation absorbed by a gel dosimeter (4).

5. The measurement device (2) according to claim 1, wherein the light source (6) comprises a means (7) for selecting at least two distinct wavelength ranges observable by the optical detector (14).

6. The measurement device (2) according to claim 1, wherein the polarization means (22) comprises a first polarizer (24) positioned between the light source (6) and the support (10), and a second polarizer (26) positioned between the support (10) and the optical detector (14).

7. The measurement device (2) according to claim 1, wherein the polarization means (22) comprises a first polarizer (24) and a second polarizer (26), both positioned between the light source (6) and the support (10), or between the support (10) and the optical detector (14).

8. The measurement device (2) according to claim 1, wherein it comprises a scattering means positioned between the light source (6) and the support (10), for uniformizing the polarization of the light beam (8) emitted by the light source (6).

9. The measurement device (2) according to claim 1, wherein it comprises means for moving the support (10) with respect to the detection axis (18) of the detector.

10. The measurement device (2) according to claim 1, wherein it comprises means for pivoting the optical detector (14) with respect to the support (10), so as to modify the scattering angle value ($\alpha$).

11. The measurement device (2) according to claim 1, wherein it comprises two oscillating mirrors, linearly or angularly oscillating at frequencies higher than the inverse of the measurement time of the measurement unit (28), positioned on the light beam path between the light source (6) and the optical detector (14).

12. A method for measuring at least one dose of radiation absorbed by a gel dosimeter (4) using a measurement device (2) according to claim 1, implementing the following steps:
    positioning a gel dosimeter (4) on the support (10) so that the light beam (8) emitted by the light source (6) illuminates the gel dosimeter (4) at a first wavelength;
    directing the optical detector (14) so that its detection axis (18) passes through the gel dosimeter (4) and forms a scattering angle ($\alpha$) with the light beam (8);
    determining, by the measurement unit (28), the light intensity observed by the optical detector (14);
    modifying the angle of polarization of the light beam (8) using the polarizing means (22) and/or modifying the wavelength of the light beam (8);
    determining again, by the measurement unit (28), the light intensity observed by the optical detector (14);
    estimating, by the calculation unit (30), the value of a ratio between the two intensities measured;
    identifying in a look-up table, by the calculation unit (30), a dose of radiation absorbed by a gel dosimeter (4) from the value of the intensity ratio estimated by the calculation unit (30).

13. The measurement method according to claim 12, wherein the preceding steps are reiterated for a gel dosimeter (4) irradiated at different known doses, in order to establish a look-up table.

14. The measurement method according to claim 12 using a measurement device (2) according to one of claims 4 to 10, wherein the scattering angle ($\alpha$) of the detector is modified as a function of the light beam (8) wavelength range selected by a selection means (7).

15. The measurement method according to claim 12, wherein the support (10) is moved between each series of measurements in order to obtain the doses of radiation absorbed by the gel dosimeter (4) in a two-dimensional plane.

16. The measurement method according to claim 12, wherein the support (10) is moved between each series of measurements in order to obtain the doses of radiation absorbed by the gel dosimeter (4) in a three-dimensional space.

17. The method for measuring at least one dose of radiation absorbed by a gel dosimeter (4) using a measurement device (2) according to claim 1, implementing the following steps:

a) positioning a gel dosimeter (4) on the support (10) so that the light beam (8) emitted by the light source (6) illuminates the gel dosimeter (4) at a first wavelength;

b) directing the optical detector (4) so that its detection axis (18) passes through the gel dosimeter (4) and forms a scattering angle (a) with the light beam (8);

c) determining, by the measurement unit (28), the light intensity observed by the optical detector (14);

d) modifying the angle of polarization of the light beam (8) using the polarization means (22);

e) determining again, by the measurement unit (28), the light intensity observed by the optical detector (14);

f) estimating, by the calculation unit (30), the value of a ratio between the two measured intensities, called polarization rate;

g) modifying the value of the wavelength of the light beam (8) emitted by the light source and/or modifying the scattering angle (a);

h) reproducing steps c) to g) several times in a row in order to obtain polarization rates for different couples of wavelength and scattering angle values;

i) modelling, by the calculation unit (30), a theoretical polarization rate as a function of the size of the scattering structures present in the gel dosimeter;

j) identifying, by the calculation unit (30), of a size of scattering structures present in each model of the theoretical polarization rates;

k) identifying in a look-up table, by the calculation unit (30), a dose of radiation absorbed by a gel dosimeter (4) from the value of the intensity ratio estimated by the calculation unit (30).

18. The measurement device (2) according to claim 1, wherein the scattering angle value ($\alpha$) is comprised between 30° and 85°.

19. The measurement device (2) according to claim 1, wherein the scattering angle value ($\alpha$) is comprised between 95° and 120°.

20. The measurement device (2) according to claim 1, wherein it comprises means for moving the support (10) with respect to the detection axis (18) of the detector, by preserving the scattering angle value ($\alpha$).

* * * * *